US010625875B2

(12) United States Patent
Guerquin

(10) Patent No.: US 10,625,875 B2
(45) Date of Patent: Apr. 21, 2020

(54) APPARATUS TO STORE A DROGUE HOSE ON AN AIRCRAFT

(71) Applicant: The Boeing Company, Chicago, IL (US)

(72) Inventor: Kris Guerquin, Bellevue, WA (US)

(73) Assignee: The Boeing Company, Chicago, IL (US)

(*) Notice: Subject to any disclaimer, the term of this patent is extended or adjusted under 35 U.S.C. 154(b) by 416 days.

(21) Appl. No.: 15/082,736

(22) Filed: Mar. 28, 2016

(65) Prior Publication Data

US 2017/0275015 A1 Sep. 28, 2017

(51) Int. Cl.
*B64D 39/02* (2006.01)

(52) U.S. Cl.
CPC ................... *B64D 39/02* (2013.01)

(58) Field of Classification Search
CPC .... B64D 39/02; B64D 37/00; B65H 75/4478; B65H 75/44; B65H 75/4402; B65H 75/425; B65H 54/28; G06Q 10/105; H04L 63/1433; H04L 63/20; H04L 63/10
See application file for complete search history.

(56) References Cited

U.S. PATENT DOCUMENTS

| 2,595,655 | A | * | 5/1952 | Hannay | B65H 75/38 137/355.2 |
| 2,599,423 | A | * | 6/1952 | Ziegler | B64F 1/28 242/390.8 |
| 2,973,171 | A | * | 2/1961 | Ward | B64D 39/02 244/135 A |
| 4,534,384 | A | * | 8/1985 | Graham | B64D 39/02 137/355.2 |
| 4,655,399 | A | * | 4/1987 | Harvey | A01G 25/095 137/355.21 |
| 5,141,178 | A | * | 8/1992 | Alden | B64D 39/02 242/483 |
| 5,573,226 | A | * | 11/1996 | Smith | B65H 57/14 226/196.1 |
| 5,961,079 | A | * | 10/1999 | Jonsson | B64F 1/362 141/279 |
| 8,517,348 | B2 | | 8/2013 | Smith | |
| 2006/0273213 | A1 | * | 12/2006 | Turk | B65H 75/425 242/397.3 |

(Continued)

OTHER PUBLICATIONS

United States Patent and Trademark Office, "Final Office Action," issued in connection with U.S. Appl. No. 15/146,404, dated Oct. 4, 2019, 10 pages.

(Continued)

*Primary Examiner* — Medhat Badawi
*Assistant Examiner* — Vicente Rodriguez
(74) *Attorney, Agent, or Firm* — Hanley, Flight & Zimmerman, LLC

(57) ABSTRACT

Apparatus to store a drogue hose on an aircraft are disclosed herein. An example apparatus includes a pod to be attached to an aircraft to store a drogue hose, a drum disposed in the pod around which the drogue hose is coiled, where an axis of the drum is aligned with a direction of flight of the aircraft, guides to move along a length of the drum to guide the drogue hose as the drogue hose is coiled around the drum, and exit rollers adjacent to a drogue chute cave of the pod, the exit rollers to guide the drogue hose as the drogue hose moves through the drogue chute cave.

25 Claims, 15 Drawing Sheets

(56) References Cited

U.S. PATENT DOCUMENTS

| | | |
|---|---|---|
| 2010/0320304 A1 | 12/2010 | Iguchi et al. |
| 2011/0193037 A1 | 8/2011 | Smith |
| 2012/0025002 A1 | 2/2012 | Zink |
| 2014/0034887 A1 | 2/2014 | Fetters, III et al. |
| 2017/0275016 A1 | 9/2017 | Guerquin |

OTHER PUBLICATIONS

United States Patent and Trademark Office, "Non-Final Office Action," issued in connection with U.S. Appl. No. 15/146,404, dated Feb. 7, 2019, 14 pages.

United States Patent and Trademark Office, "Requirement for Restriction and/or Election," issued in connection with U.S. Appl. No. 15/146,404, dated Aug. 16, 2018, 6 pages.

United States Patent and Trademark Office, "Notice of Allowance," issued in connection with U.S. Appl. No. 15/146,404, dated Feb. 5, 2020, 8 pages.

* cited by examiner

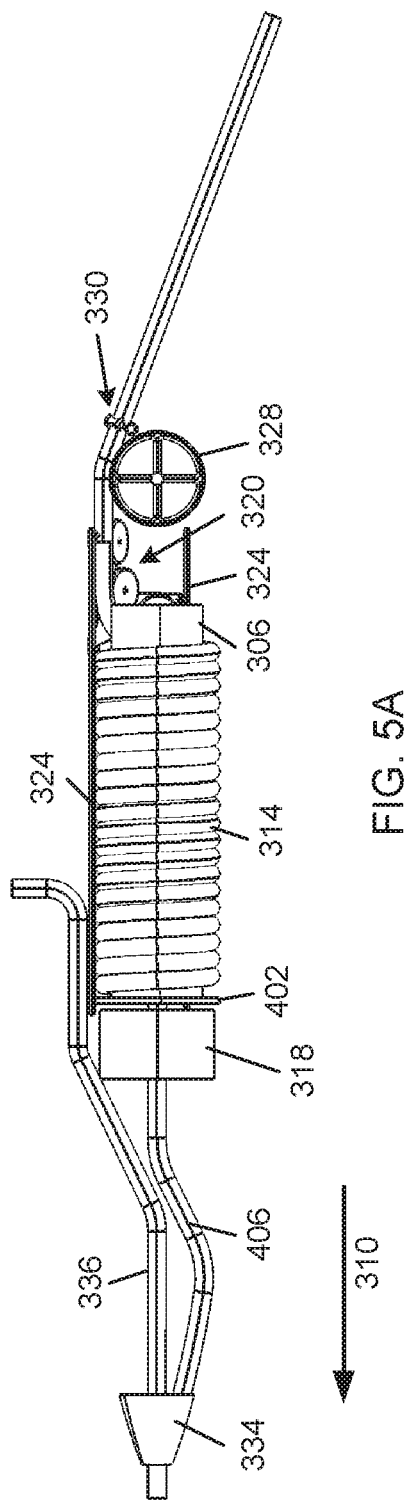
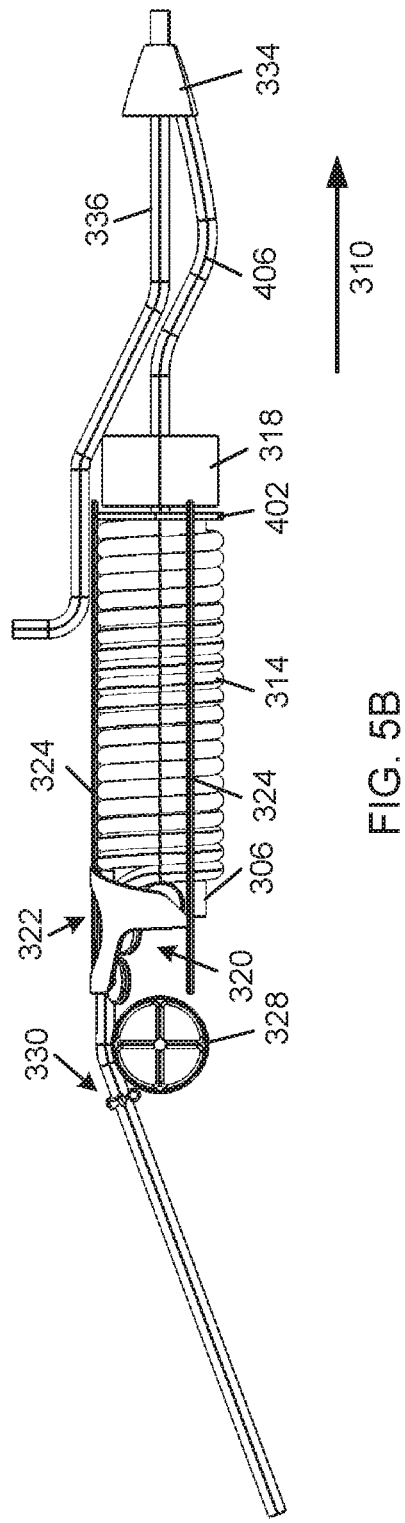

APPARATUS TO STORE A DROGUE HOSE ON AN AIRCRAFT

FIELD OF THE DISCLOSURE

This disclosure relates generally to drogue hoses and, more particularly, to apparatus to store a drogue hose on an aircraft.

BACKGROUND

Drogue hoses and chutes are used in an aircraft, such as a tanker aircraft, for in-flight refueling of a second aircraft. Drogue hoses and chutes are typically disposed in refueling pods attached under the wings of the tanker aircraft. In some applications, such as buddy-buddy refueling, a refueling pod may be attached to a first small aircraft to refuel another small aircraft.

SUMMARY

An example apparatus includes a pod to be attached to an aircraft to store a drogue hose, a drum disposed in the pod around which the drogue hose is coiled, where an axis of the drum is aligned with a direction of flight of the aircraft, guides to move along a length of the drum to guide the drogue hose as the drogue hose is coiled around the drum, and exit rollers adjacent to a drogue chute cave of the pod, the exit rollers to guide the drogue hose as the drogue hose moves through the drogue chute cave.

Another example apparatus includes a track positioned adjacent a rotatable drum, a cart slidably coupled to the track, a movement of the cart parallel to an axis of the drum, and pulleys rotatably mounted to the cart to move along a length of the drum as the drum rotates, the pulleys to guide a fuel hose as the fuel hose coils around the drum.

Yet another example apparatus includes a drum to rotate about a central axis, a hose coiled around the drum, wherein the hose is coiled in a single layer along a length of the axis of the drum as the drum rotates, and guides to move along the length of the drum to guide the hose as the hose is coiled around the drum, the guides to prevent slack in the hose.

BRIEF DESCRIPTION OF THE DRAWINGS

FIGS. 5A and 5B are side views of example apparatus disposed within the example refueling pod disclosed herein.

The figures are not to scale. Wherever possible, the same reference numbers will be used throughout the drawing(s) and accompanying written description to refer to the same or like parts.

DETAILED DESCRIPTION

The apparatus disclosed herein may be used for in-flight refueling of an aircraft. More specifically, the apparatus described herein includes a refueling pod attached to the aircraft that stores a drogue hose and a drogue chute. The refueling pod may be attached under a wing or on the fuselage of the aircraft (e.g., a tanker aircraft) to enable transfer of fuel to another aircraft during flight.

In the example refueling pod described herein, the drogue hose is coiled around a rotating drum that is located in the refueling pod and has an axis of rotation aligned with the direction of flight. The drogue hose is guided by guides (e.g., pulleys or rollers) that move along the length of the drum as the drogue hose is coiled around the drum. The guides may be attached to a cart that moves (e.g., slides) along a track. The track may be coupled to an interior structure of the refueling pod or may be an integral part of the structure of the refueling pod. In some examples, the track may be permanently attached to the interior structure of the refueling pod and positioned adjacent the drum. The movement of the cart along the track is coordinated with (e.g., is synchronized with) a rotation of the drum to prevent slack in the drogue hose as the drogue hose is coiled around the drum. Additionally, one or more guiding wheels or rollers coupled to an interior structure or surface of the refueling pod adjacent an opening (e.g., a drogue chute cave) guide the drogue hose as the drogue hose moves through the opening.

Figure 1:
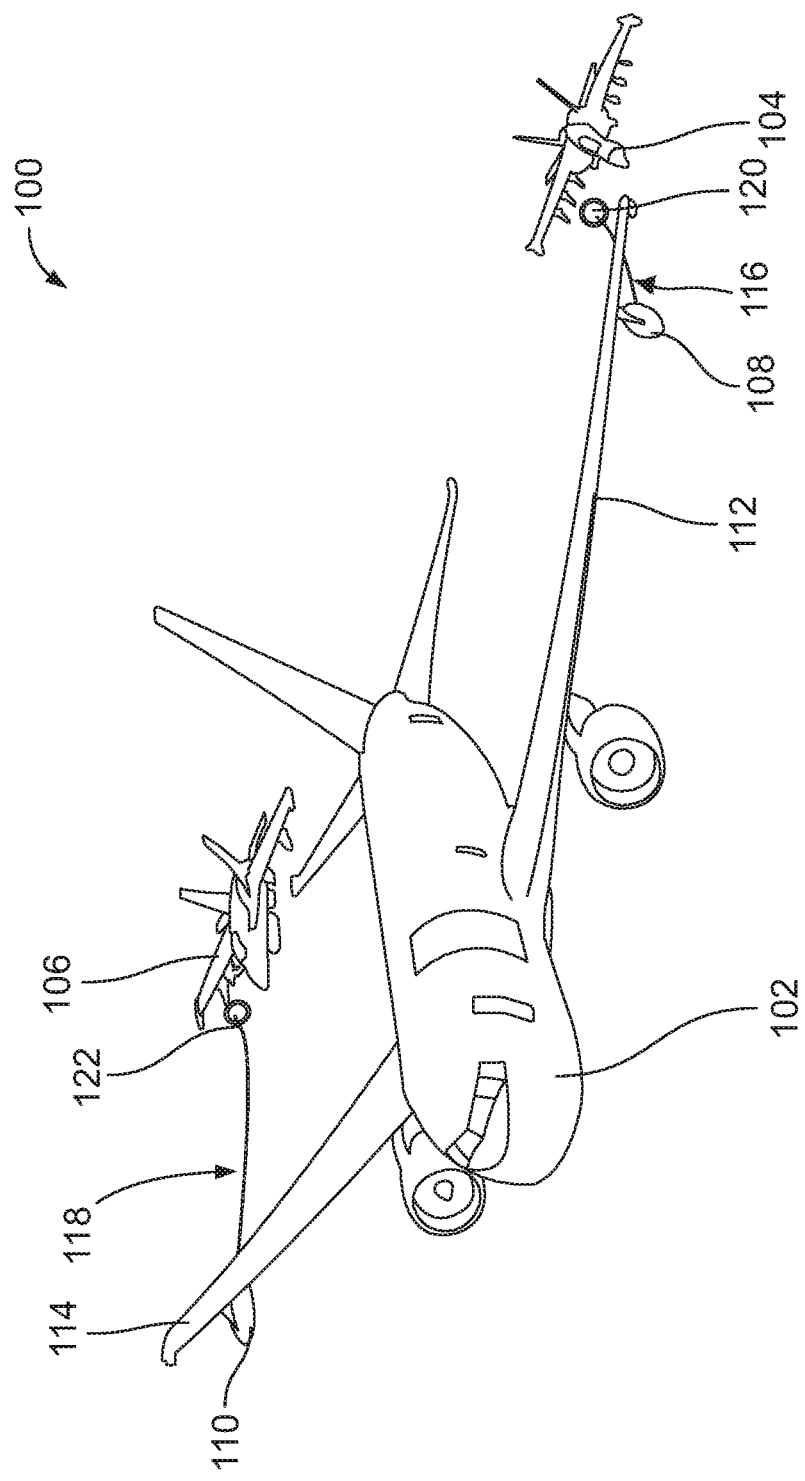
FIG. 1 represents an example environment in which the apparatus disclosed herein may be implemented.

FIG. 1 represents an example environment 100 in which the example apparatus disclosed herein may be implemented. The example environment 100 includes a tanker aircraft 102 that may be used to refuel one or more fighter jets 104, 106 by implementing a drogue-and-chute refueling operation during flight. The tanker aircraft 102 includes two under-wing refueling pods (e.g., wing aerial refueling pods (WARPs)) 108, 110 attached to respective wings 112, 114 of the tanker aircraft 102. Each of the example under-wing refueling pods 108, 110 includes a respective drogue hose 116, 118 and drogue chute 120, 122 to facilitate refueling of the fighter jets 104, 106. When not in use for refueling operations, the drogue hoses 116, 118 are stored in the respective under-wing refueling pods 108, 110. Alternatively, in other example environments, a refueling pod, similar to the under-wing refueling pods 108, 110, may be attached to the body of a first fighter jet (e.g., the fighter jet 104) to refuel a second fighter jet (e.g., the fighter jet 106) using a buddy-buddy type refueling operation. Buddy-buddy type refueling is particularly convenient for carrier-based aircraft.

Figure 2:
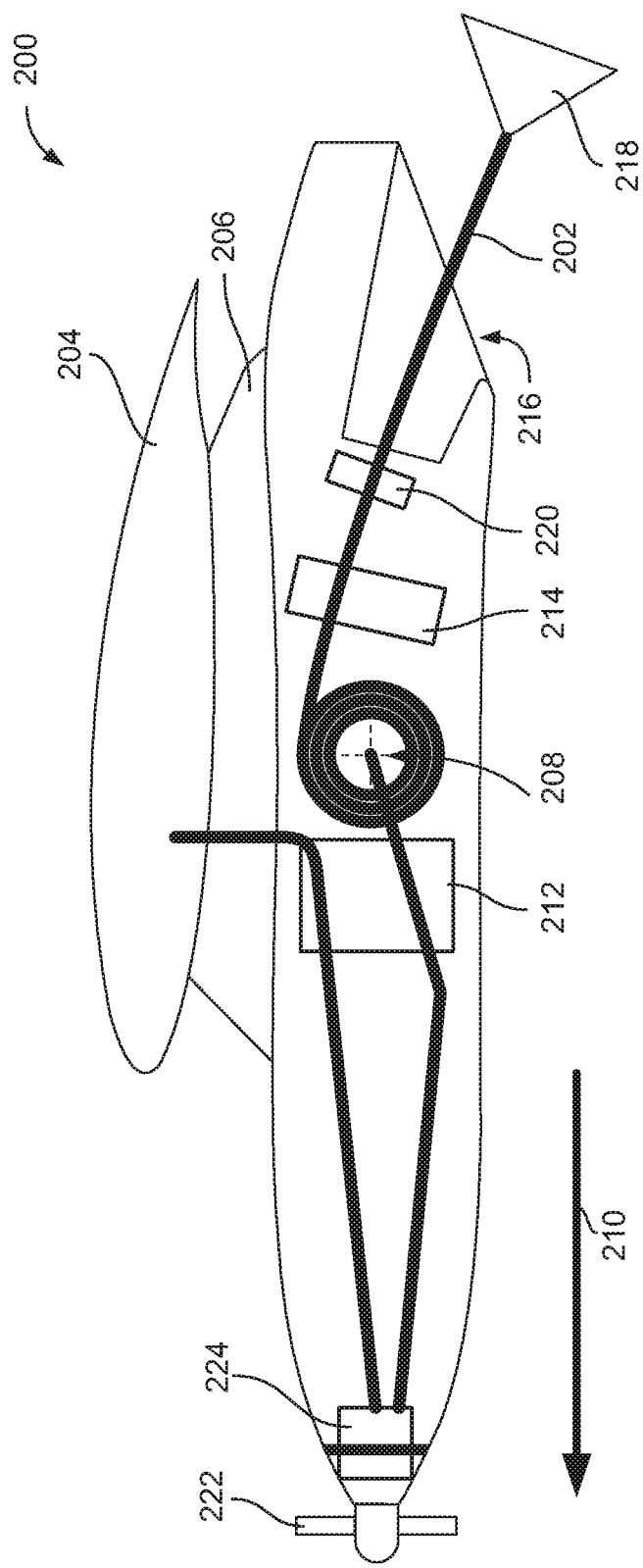
FIG. 2 is a diagram of a known refueling pod.

FIG. 2 is a diagram of a known refueling pod 200 for storing a drogue hose 202. The known refueling pod 200 is attached to a wing 204 of an aircraft via a pylon 206. A rotating spool 208 is located in the refueling pod 200 and has an axis of rotation perpendicular to a direction of flight 210 of the aircraft. The spool 208 is rotated by a transmission 212 with a motor to wind and unwind the drogue hose 202 around the spool 208. The drogue hose 202 is wrapped (e.g., wound) around the spool 208 when not being used for a refueling operation. The drogue hose 202 wraps around the spool 208 in multiple layers (e.g., three layers) to enable the full length of the drogue hose 202 (e.g., 70-90 feet) to be stored on the spool 208.

A guiding mechanism 214 is located in the refueling pod 200 between the spool 208 and an opening 216 for a drogue chute 218 to guide the drogue hose 202 as it winds and unwinds around the spool 208. An exit guide 220 is also disposed adjacent the opening 216 to guide the drogue hose 202 as the drogue chute 218 is deployed. An impeller (e.g., a ram air turbine (RAT)) 222 is located at a front end (e.g., a forward end) of the refueling pod 200, opposite the opening 216, to provide power to the refueling pod 200 for a fuel pump 224 adjacent the impeller 222 and/or the motor 212. The fuel pump 224 is operative to pump fuel from one or more fuel tanks of a tanker aircraft through the drogue hose 202 to a second aircraft.

Such known under-wing refueling pods (e.g., refueling pod 200) are currently approximately 34 inches or more in diameter and can cause aerodynamic interference problems such as local low pressure, local supersonic airflow, increased drag, shock waves, noise, buffeting and vibration. In particular, the junction of the wing 204, the pylon 206, and the refueling pod 200 is an area that experiences aerodynamic interference problems. The aerodynamic interference results in a reduction of aircraft speed, necessity to remove the refueling pod(s) 200 for some operations, and higher operational and maintenance costs of the aircraft.

The example apparatus described herein reduce the diameter of the refueling pods by approximately 9 inches. An example refueling pod 300 disclosed in detail below increases a slenderness ratio (e.g., the ratio of length of the refueling pod 300 to the diameter of the refueling pod 300) by 36%, decreases frontal area by 46%, and decreases wetted area by 26%. The reduction in overall size of the example refueling pod 300 described herein substantially reduces the aerodynamic interference due to the refueling pods and lessens adverse effects of the refueling pods on the aircraft. Because of the reduction in size, the example refueling pod 300 of is more suitable for use with smaller tanker aircraft than the known refueling pod (e.g., refueling pod 200 of FIG. 2).

Figure 3:
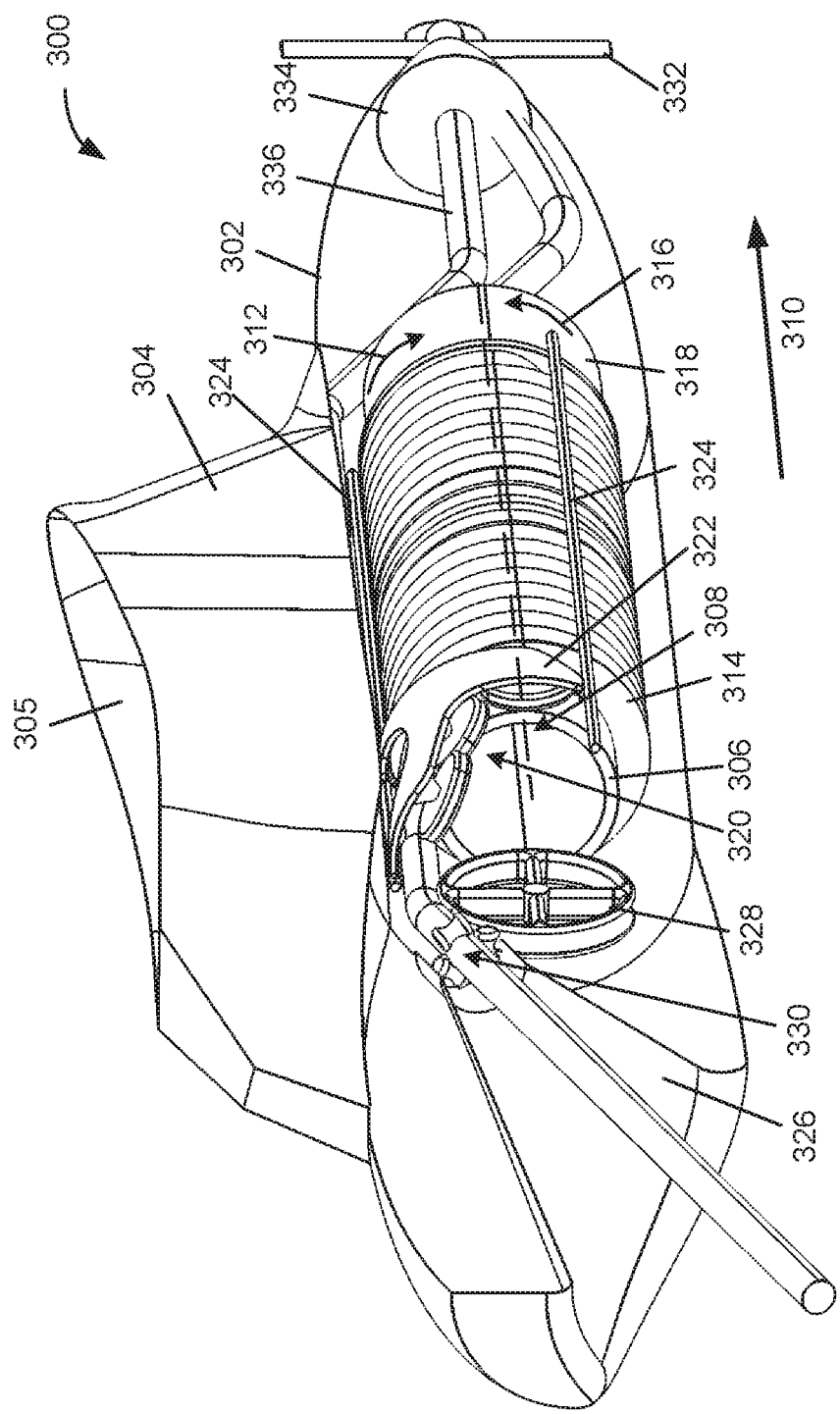
FIG. 3 is a diagram of an example refueling pod that may be implemented to refuel an aircraft.

FIG. 3 is a diagram of an example refueling pod 300 disclosed herein that may be implemented for in-flight refueling operations, such as the drogue-and-chute in-flight refueling operation of the example environment 100 of FIG. 1. The example refueling pod 300 includes a housing 302 (e.g., the body of the refueling pod 300) that may be attached to an aircraft (e.g., the tanker aircraft 102 of FIG. 1, the fighter jets 104, 106 of FIG. 1, etc.) via a pylon 304. In some examples, the pylon 304 has a surface 305 contoured to interface with and couple the pod 300 to wings 112 and 114 of the example aircraft 102. Thus, the example refueling pod 300 can be attached to the wing of an aircraft to replace a known refueling pod (e.g., the known refueling pod 200). Alternatively or additionally, the surface 305 of the pylon 304 may be contoured to correspond to a contour of the body or fuselage of an aircraft (e.g., the tanker aircraft 102 or the fighter jets 104, 106) to attach the pod 300 to the fuselage of the aircraft.

The example refueling pod 300 contains a drum 306 located in the housing 302 and having a central axis 308 parallel to a direction of flight 310 of the aircraft. The drum 306 is supported by the interior structure of the housing 302 allowing rotation around the axis. The drum 306 may rotate in a first direction 312 about the central axis 308 to coil a drogue hose 314 around the drum 306 and a second direction 316 about the central axis 308 to uncoil the drogue hose 314. In some examples, a transmission 318 with a motor rotates the drum 306 in the first direction 312 and/or the second direction 316. The transmission 318 may also be attached to the interior structure of the housing 302. The entire length of the drogue hose 314 (e.g., between 70 feet and 90 feet) is coiled around the drum 306 in a single layer as the drum 306 rotates in the first direction 312. As the drogue hose 314 is coiled around the drum 306, guides 320 (e.g., rollers, pulleys, etc.) guide the drogue hose 314 to ensure the drogue hose 314 is coiled tightly (i.e., coiled such that there is no slack in the drogue hose 314). The guides 320 are also positioned and/or sized to prevent damage to and/or malfunction of (e.g., collapse) the drogue hose 314 as the drogue hose 314 is wound around the drum 306.

The example guides 320 are attached to a cart 322 that slides (e.g., moves, rolls) along a track 324 (e.g., a set of rails) that is attached to the housing 302. In some examples, a long screw (e.g., screw 902 of FIG. 9) is used to move the cart 322 along the track 324. In other examples, the cart 322 is propelled using a cable winch or chain in conjunction with the track 324. In such examples, a cable or chain, which is attached to the cart 322 and propelled via the transmission 318, allows the movement of the cart 322 to be coordinated and/or synchronized with the rotation of the drum 306 in a way similar to the screw-based propulsion method described herein.

In some examples, the drum 306 is rotated by the transmission 318 in the second direction 316 to facilitate a refueling operation between two aircraft. As the drum 306 rotates in the second direction 316, a drogue chute is deployed from an opening 326 (e.g., a drogue chute cave) of the housing 302. Alternatively, when the drogue chute is deployed, the transmission 318 may be neutral and allow the force caused by the drogue chute traveling through the air to rotate the drum 306 in the second direction 316 and uncoil the drogue hose 314.

One or more guides 328, 330 may be disposed adjacent the opening 326 to guide the drogue hose 314 as the drogue hose 314 is coiled and/or uncoiled. The one or more guides 328, 330 may be attached to the housing structure 302. In some examples, a single guiding wheel 328 (e.g., an exit guide, exit roller) is positioned adjacent the opening 326 to align the drogue hose 314 with the guides 320 to prevent slack when coiling the drogue hose 314. Additionally, a set of rollers 330 (e.g., exit guides, exit rollers) may be positioned adjacent the opening 326 and located around a circumference of the drogue hose 314 to guide the drogue hose 314 through the opening 326. The opening 326 may be shaped (e.g., tapered) to enable the drogue chute to fit inside of a larger portion of the opening 326 and not through a narrow portion of the opening 326. A diameter of the narrow portion of the opening 326 is approximately a diameter of the drogue hose 314.

In the illustrated example, an impeller (e.g., a ram air turbine (RAT)) 332 is located at a front end (e.g., a forward end) of the housing 302 and may produce power to enable proper function of the refueling pod 300. For example, the impeller 332 rotates during flight to produce power, via a power plant, for a fuel pump 334 and/or for the motor to rotate the drum 306 via the transmission 318. The fuel pump 334 is coupled to a fuel line 336 and operative to pump fuel from a fuel tank of an aircraft (e.g., the tanker aircraft 102) to which the refueling pod 300 is attached to a fuel tank of a second aircraft (e.g., the fighter jets 104, 106, bombers, attack planes, drones, transport planes, reconnaissance planes, helicopters, or other tankers) via the drogue hose 314. When the fuel pump 334 and/or the transmission 318 are not in use (e.g., a refueling operation is not taking place) blades of the impeller 332 are "feathered" (i.e., set to such a pitch to produce zero moment while minimizing air drag due to the impeller 332 for the tanker aircraft 102). In other examples, the power for fuel pump 334 and transmission 318 to rotate the drum 306 can be provided by a power source of the aircraft 102. In such examples, the refueling pod 300 does not include the impeller 332.

Figure 4:
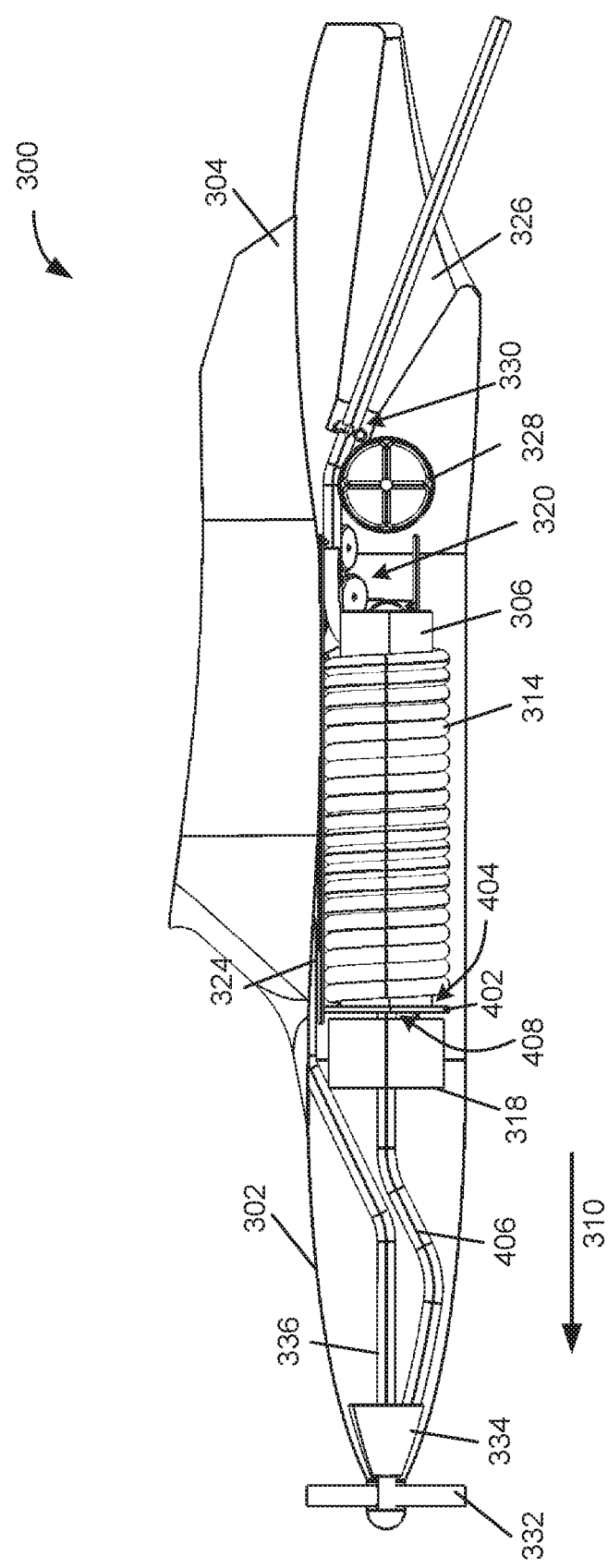
FIG. 4 is a side section view of the example refueling pod disclosed herein.

FIG. 4 is a side section view of the example refueling pod 300 disclosed herein. As shown in FIG. 4, the drum 306 may include a plate or disk 402 at a front end 404 of the drum 306 adjacent the transmission 318. In some examples, the plate 402 acts as a stop to prevent the drogue hose 314 from sliding off the front end 404 of the drum 306 as the drogue hose 314 is coiled around the drum 306. A non-rotating fuel line 406 extending between the fuel pump 334 and the drum 306 is coupled to a first end of a rotating tube 408. The drogue hose 314 is coupled to a second end of the rotating tube 408 on an outside of the drum. The coupling between the rotating tube 408 and each of the non-rotating fuel line 406 and the drogue hose 314 is sealed in a manner that allows relative rotation of the rotating tube 408 while preventing leaks at the first and second ends of the rotating tube 408.

FIGS. 5A and 5B are side views from the left and right sides, respectively, of the components located within the housing 302. The cart 322 is shaped as shown on FIG. 5B to indicate the function only and does not necessarily describe the only real and practical shape of the cart 322. The function of the cart 322 is to keep guides 320 in proper geometrical position (e.g., alignment) against drogue hose 314 and allow the cart 322 to move along the track 324 (e.g., a set of rails).

Figure 6:
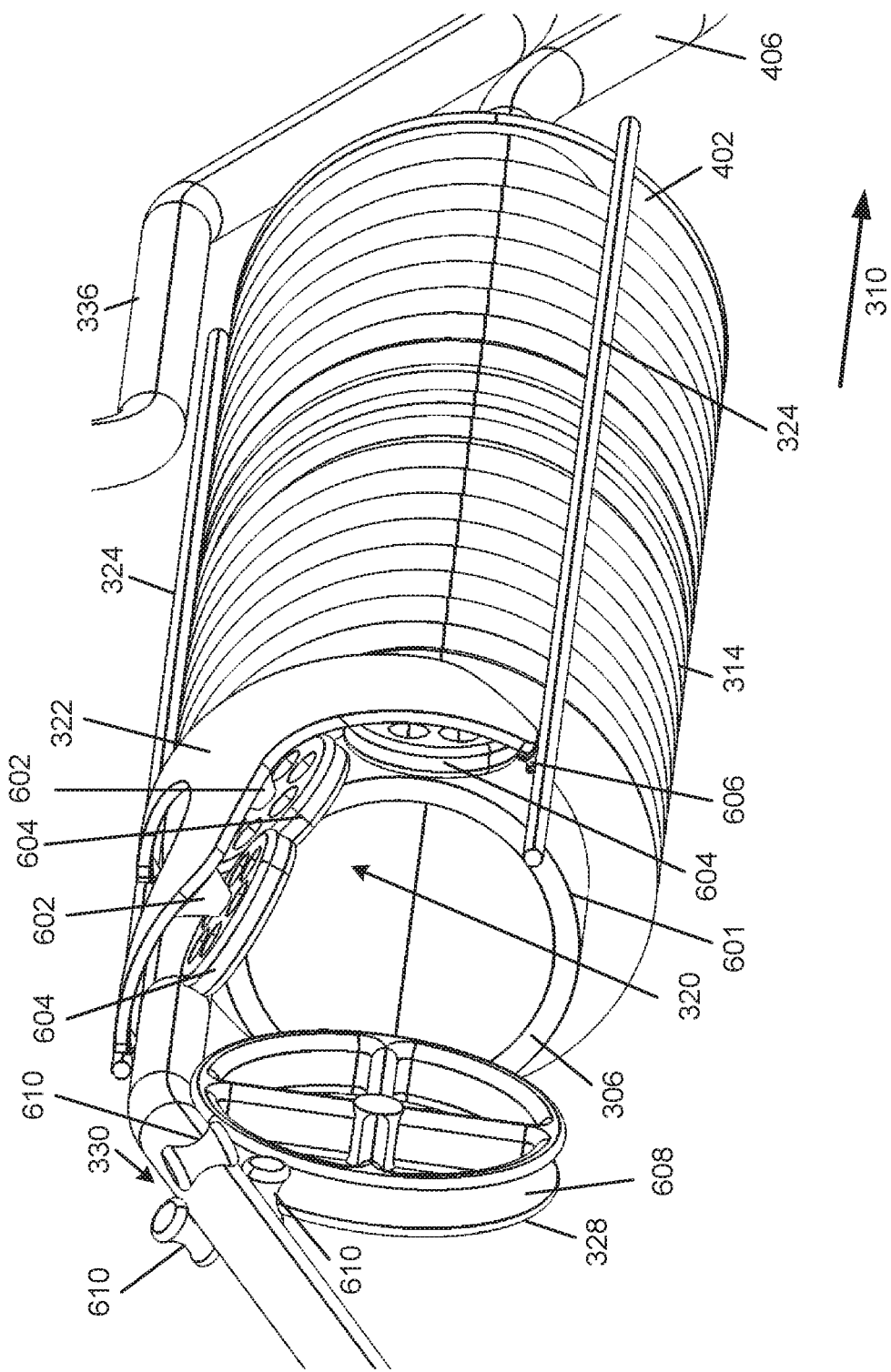
FIG. 6 is a more detailed view of the example drum and guiding apparatus disclosed herein.

FIG. 6 is a more detailed view of the example drum 306 and cart 322 disclosed herein. In the illustrated example, the drum 306 is hollow to minimize the weight of the refueling pod 300 without compromising its strength. The diameter of the drum 306 is selected based on the ability of the drogue hose 314 to bend (e.g., an allowable bend radius of the drogue hose 314 based on its flexibility). The allowable bend radius of the drogue hose 314 may be the same allowable bend radius as the hose 202 in the known refueling pod 200 of FIG. 2. For example, the minimum radius about which the drogue hose 314 can coil may be approximately 7.7 inches and, thus, the diameter of the drum 306 used with the example drogue hose 314 is approximately 15.4 inches or larger. In other examples, the drogue hose 314 may have a different bend radius and, thus, a drum 306 having a larger diameter may be required or a drum 306 having a smaller may be sufficient.

As illustrated in FIG. 6, the example cart 322, including all of the guides 320, is shaped and sized to be contained (e.g., to fit) within a space between a surface 601 of the drum 306 on which the drogue hose 314 is coiled and a structure of the housing 302 for every position of the cart 322 as the cart 322 travels along the track 324. To maintain a low level of friction, the guides 320 do not contact the drum 306 and are coupled to the cart 322 such that the guides 320 are able to rotate (i.e., to act as pulleys) as the drogue hose 314 passes over the guides 320. The cart 322 is positioned on the track 324 (i.e., on the rails) such that the cart 322 is able to move forward or backward along the track 324. The track 324 (e.g., the rails) is fixed in a position adjacent the drum 306 so that the track 324 does not to interfere with the drogue hose 314 being coiled or uncoiled around the drum 306. For example, the track 324 may be integral to the structure of the housing 302 and positioned such that the drogue hose 314 may coil 306 around the drum 306 between the surface 601 of the drum 306 and the track 324. Positioning the guides 320 within the shadow of the drogue hose 314 reduces the amount of excess space in the housing 302 due to the guides 320, the cart 322, and the track 324.

The example cart 322 includes protrusions (e.g., bosses, posts, etc.) 602 on an inner surface of the cart (e.g., the surface facing towards the drum 306) to couple each of the guides 320 to the cart 322. In some examples, the protrusions 602 may include bearings and/or fasteners to couple the guides 320 to the protrusions and enable the guides 320 to rotate freely as the drogue hose 314 passes over the guides 320 when the drogue hose 314 is coiling and/or uncoiling. The example guides 320 may include a groove 604 to at least partially receive the drogue hose 314 as the guides 320 guide the coiling and uncoiling of the drogue hose 314. Alternatively, the curved surface of the guides 320 may be smooth (e.g., a disk) that rotates as the drogue hose 314 is coiled around the drum 306. The cart 322 also includes wheels 606 (e.g., rollers) to enable the cart 322 to move along the track 324 with minimum friction as the drogue hose 314 is coiled or uncoiled around the drum 306. In the example shown, the wheels 606 are located between the rails 324 and have grooves to guide the wheels 606 along the track 324 to prevent the cart 322 from falling off (e.g., becoming misaligned with) the track 324. Alternatively, the wheels 606 may be positioned inside of grooves integrated into a shape of the rails 324 to prevent the cart 322 from falling off the track 324.

Additionally, the guiding wheel 328 and the set of rollers 330 may include grooves 608 and/or curved surfaces 610 to guide and/or receive the drogue hose 314 as the drogue hose 314 travels through the guiding wheel 328 and the set of rollers 330.

Figure 7:
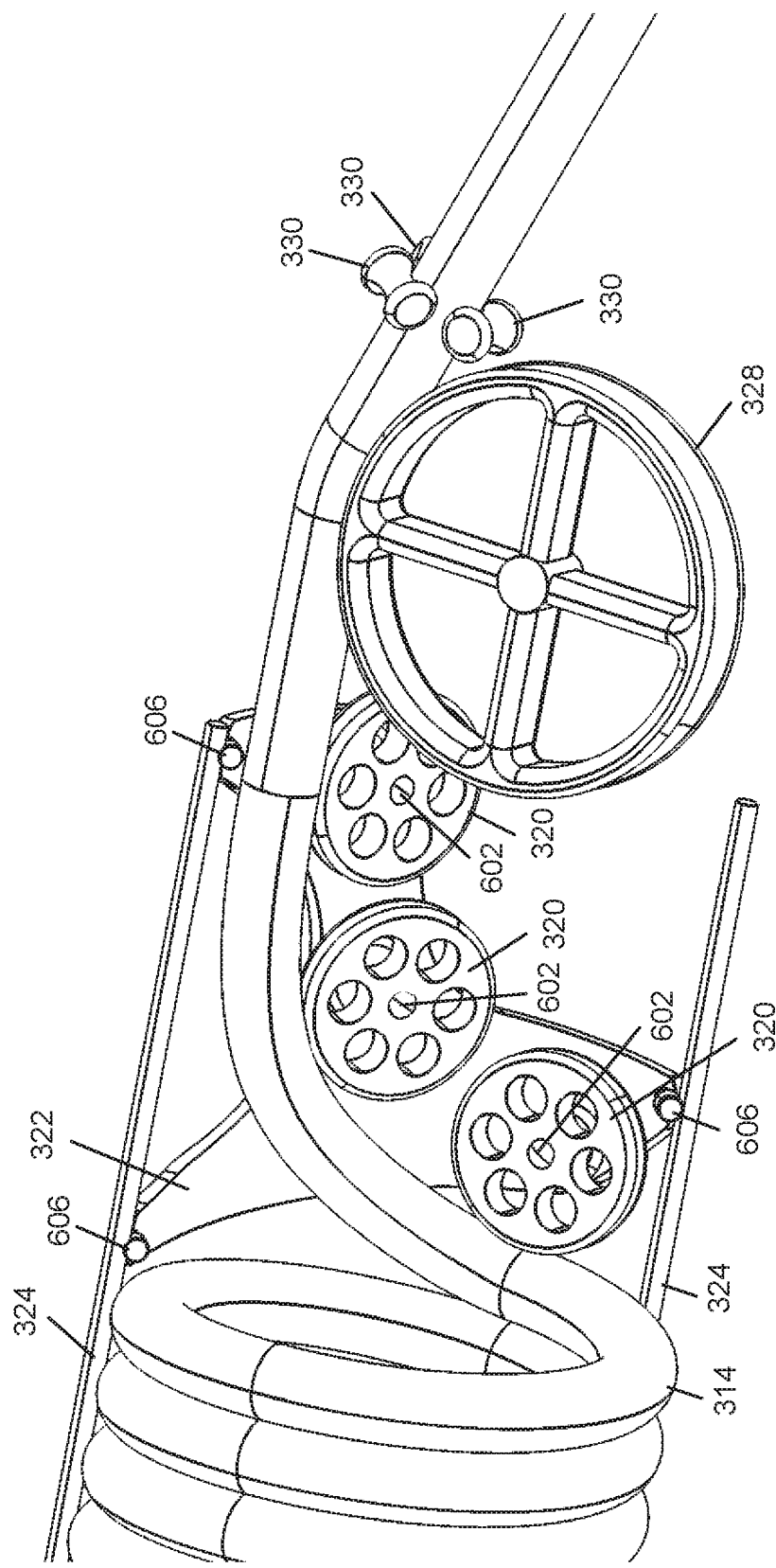
FIG. 7 is a more detailed view of the drogue hose and example guiding apparatus disclosed herein.

FIG. 7 is a more detailed view of the drogue hose 314 and example guiding apparatus disclosed herein (e.g., the guides 320, 328, 330, the cart 322, and the track 324). In the illustrated example, three guides 320 are used to guide the drogue hose 314 as the drogue hose 314 is coiled around the drum 306. The number and position of the guides 320 in the example refueling pod 300 is selected to prevent damage to the drogue hose 314, such as collapse, kinking, etc. as the drogue hose 314 coils around the drum 306. For example, a single larger guide may prevent collapse of the drogue hose 314, but not fit within the housing 302 and a single smaller guide may not be sufficient to prevent the drogue hose 314 from being damaged. Thus, the placement and sizing of the example guides 320 selected is based on the flexibility of the example drogue hose 314 and maintains a minimum radius of curvature (e.g., is equivalent to or greater than the minimum radius of curvature or bend radius that will not damage the drogue hose 314) of the drogue hose 314 as the drogue hose 314 is coiled around the drum 306. In other examples where the drogue hose 314 is more or less flexible, a different number, a different size, or a different placement of the guides 320 may be sufficient and/or required to prevent damage of the drogue hose 314 and may be implemented in the example refueling pod 300.

Figure 8:
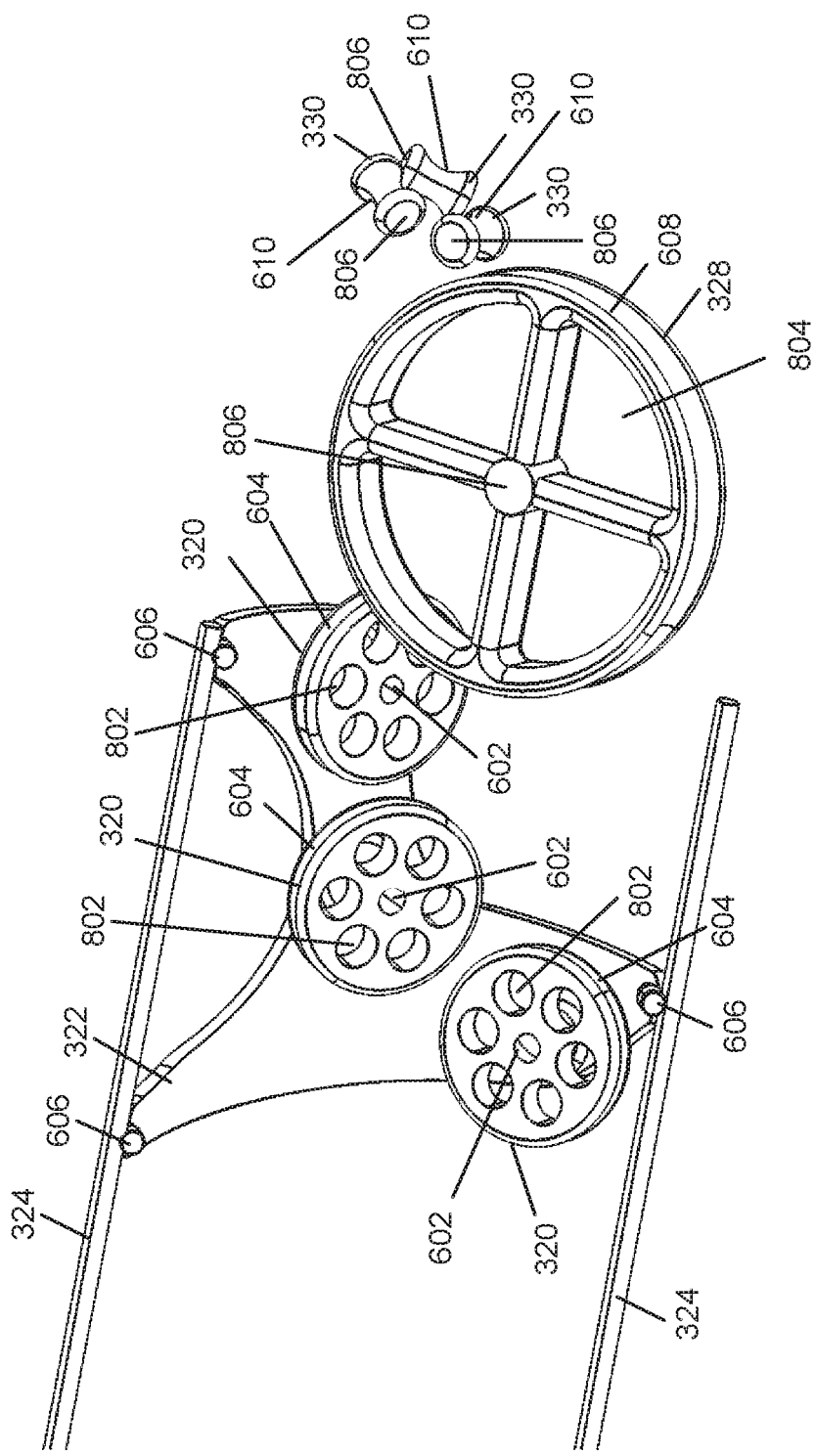
FIG. 8 is a detailed view of the example guiding apparatus disclosed herein.

FIG. 8 is a detailed view of the guiding apparatus disclosed herein. In the illustrated example, the guides 320 include apertures 802 (e.g., multiple apertures). The apertures 802 may be implemented in the guides 320 to reduce the weight of the guides 320. Alternatively, the guides 320 may be solid disks. Additionally or alternatively, the guiding wheel 328 may include apertures 804 to reduce the weight of the guiding wheel 328. The guiding wheel 328 and/or the set of rollers 330 may be attached to the interior of the housing 302 in a manner that allows free rotation of the guiding wheel 328 and rollers 330. The guiding wheel 328 and/or the set of rollers 330 may include apertures 806 through which fasteners or brackets may be disposed.

Figure 9:
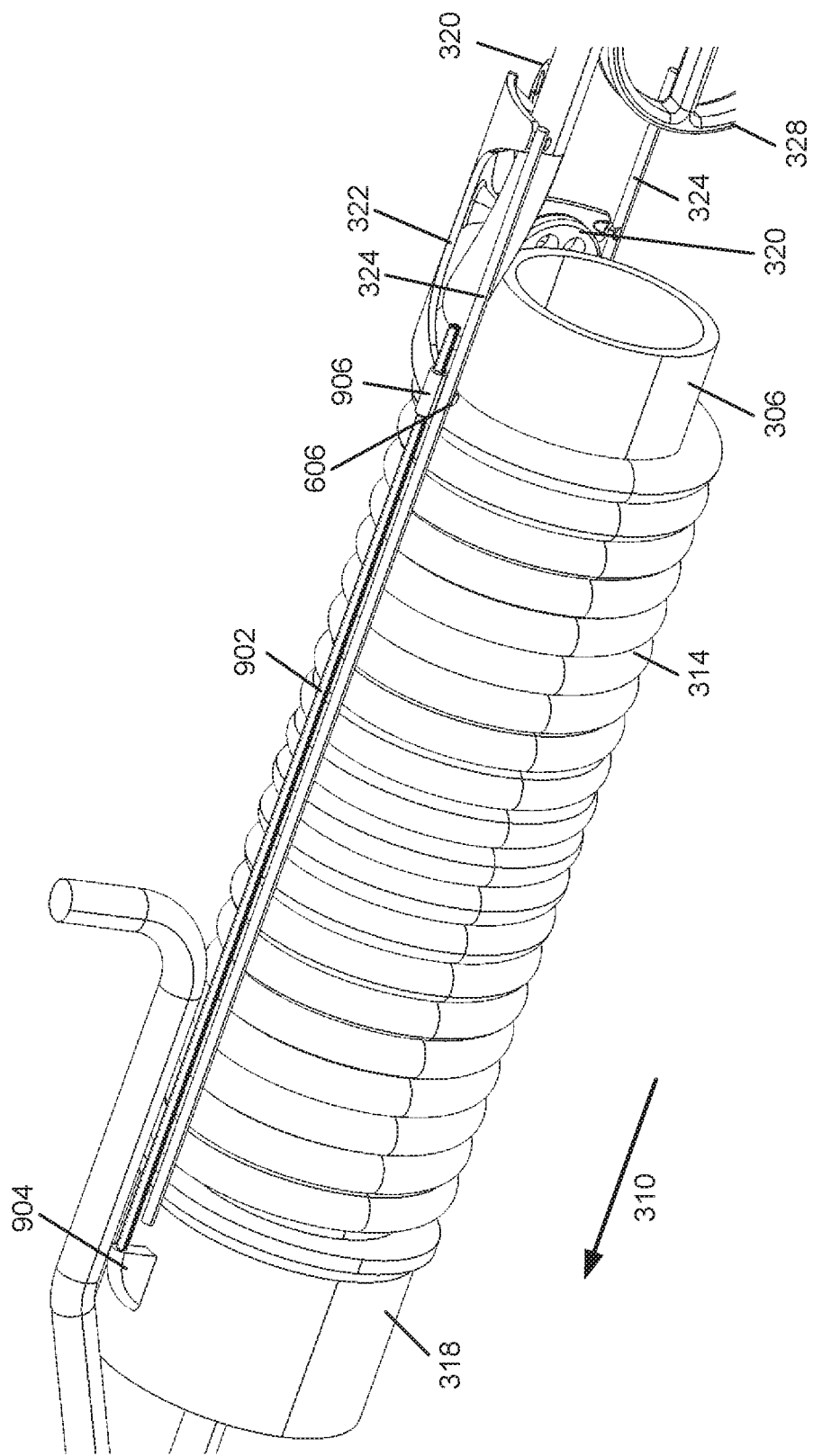
FIG. 9 depicts an example method of moving the cart along the track of the example refueling pod disclosed herein.

FIG. 9 depicts an example screw 902 operative to move the cart 322 along the track 324 of the example refueling pod 300 disclosed herein. The example screw 902 is positioned adjacent one rail of the track 324 and is operative to coordinate the movement of the cart 322 with the rotation of the drum 306. The example screw 902 may be positioned adjacent either of the two rails of the track 324. For example, the cart 322 moves along the track 324 a distance equivalent to a width (e.g., a diameter) of the drogue hose 314 for each complete rotation of the drum 306. Thus, the rotations per minute (RPM) of the screw 902 and the pitch of the thread are selected to provide a movement rate of the cart 322 equal to one width of the drogue hose 314 for each complete rotation of the drum 306. The screw 902 is coupled to and propelled (e.g., rotated) by the transmission 318 with the motor. A projection 904 (e.g., a second output) of the transmission 318 coordinates the rotation of the screw 902 with the rotation of the drum 306.

The screw 902 is connected to the cart 322 via a nut 906 attached to the cart 322. The nut 906 has inner threads that engage with outer threads of the screw 902. When the screw 902 is rotated, an interaction between the inner threads of the nut 906 and the outer threads of the screw 902 causes the cart 322 to move along the track 324.

Figure 10:
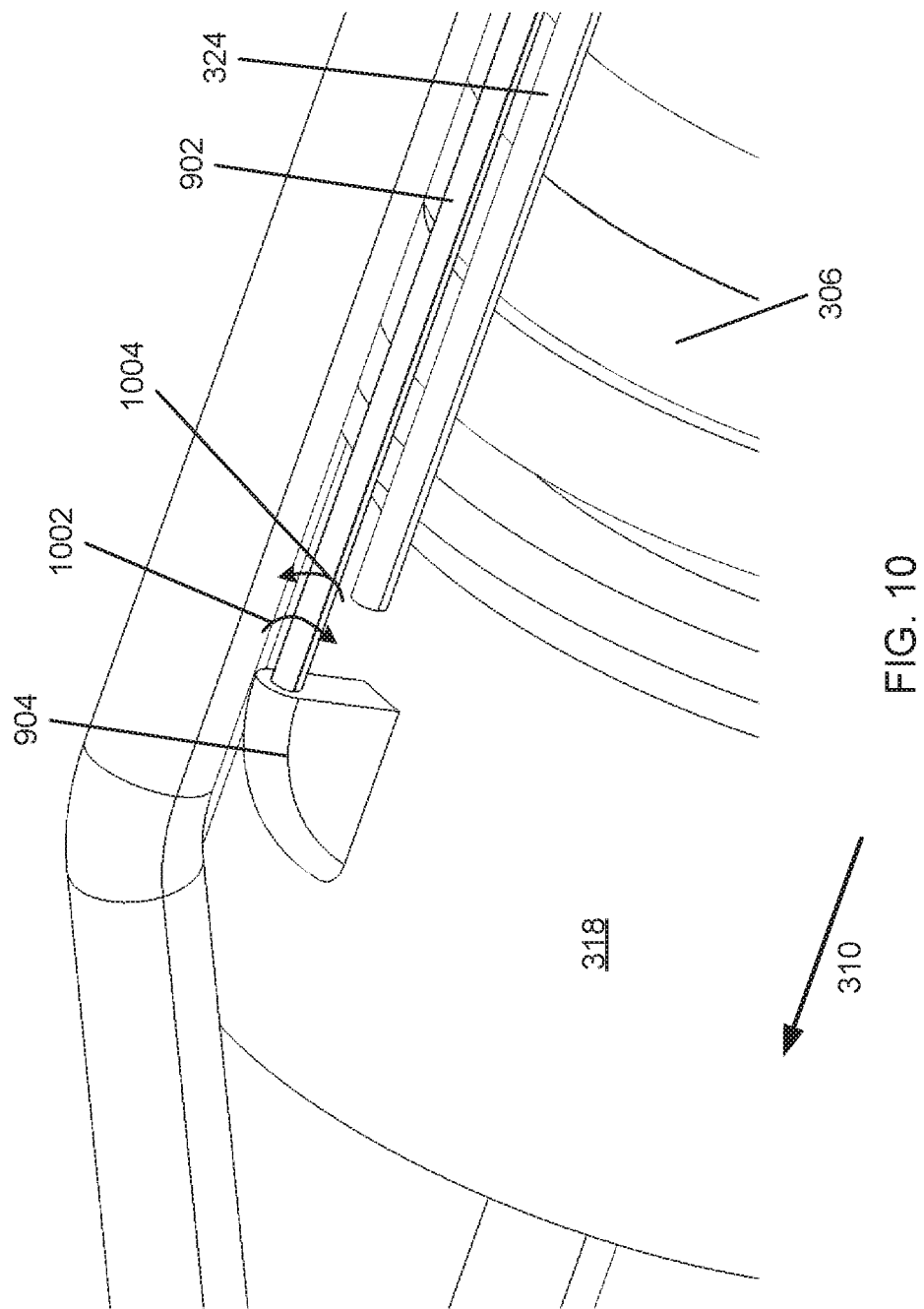
FIG. 10 is a detailed view of the example method of moving the cart along the track.

FIG. 10 is a detailed view of the example screw 902 and the example projection 904 used to move the cart 322 along the track 324. The example projection 904 is operative to rotate the screw 902 in a first direction 1002 and a second direction 1004. In some examples, the screw 902 and nut 906 are threaded such that rotating the screw 902 in the first direction 1002 causes the cart 322 to move forward relative to the direction of flight 310 (e.g., the cart 322 moves towards the motor 318 as the drogue hose 314 is unwound from the drum 306) and rotating the screw 902 in the second direction 1004 causes the cart 322 to move aft relative to the direction of flight 310 (e.g., the cart 322 moves away from the motor 318 as the drogue hose 314 is wound around the drum 306). Alternatively, the screw 902 and nut 906 may be threaded such that rotating the screw 902 in the first direction 1002 causes the cart 322 to move aft relative to the direction of flight 310 and rotating the screw 902 in the second direction 1004 causes the cart 322 to move forward relative to the direction of flight 310.

Figure 11:
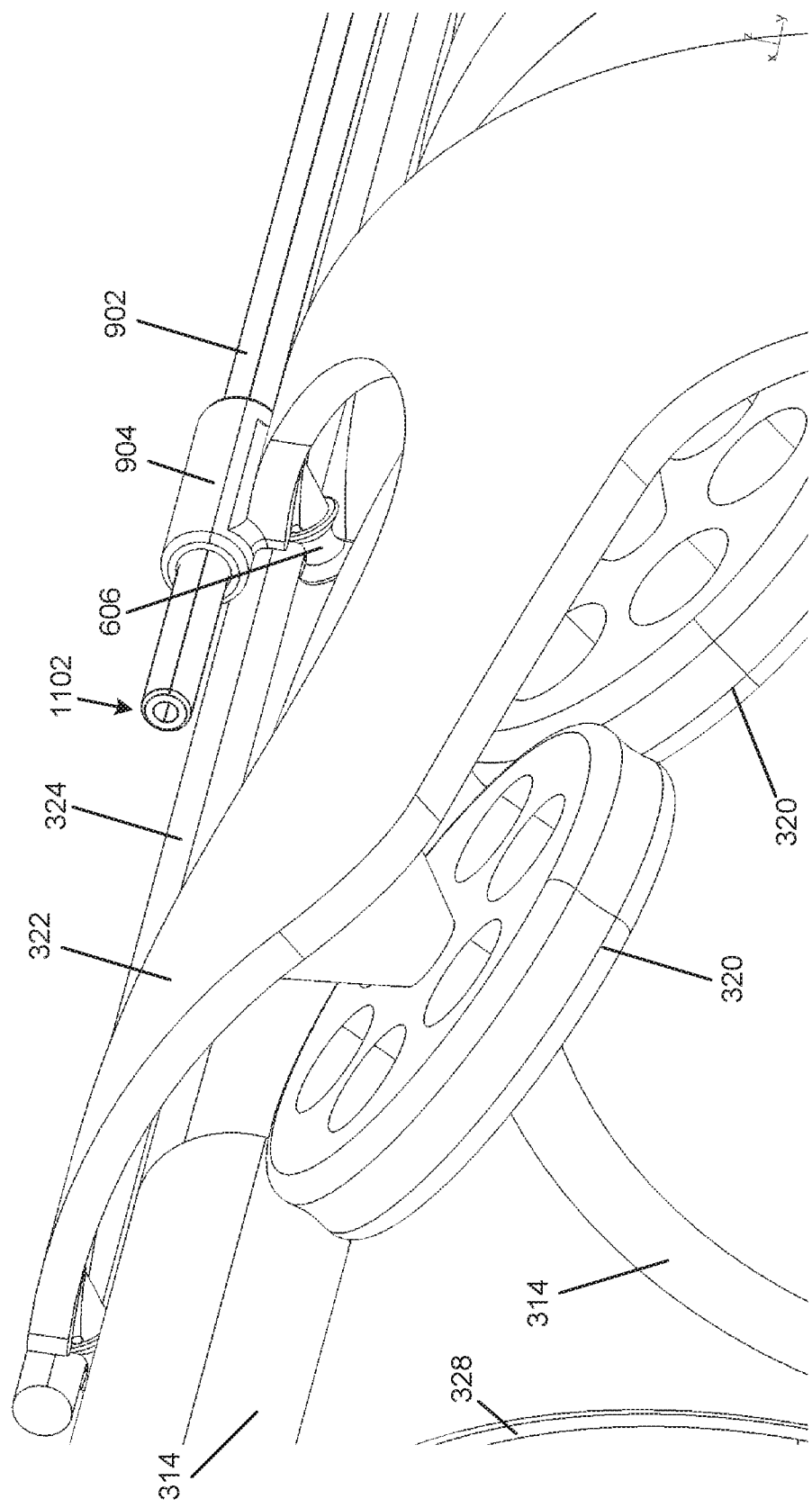
FIG. 11 is another detailed view of the example method of moving the cart along the track.

FIG. 11 is a detailed view of the screw 902 and the example nut 906 attached to the cart 322. The example nut 906 is attached to the cart 322 adjacent a wheel 606 of the cart 322. Alternatively, the nut 906 may be attached to the cart 322 in any location in which the nut 906 is threaded on the screw 902 to enable the cart 322 to move along the track 324.

The example screw 902 includes an end 1102 that is coupled to and supported by a bracket attached to the example refueling pod 300. The support or bracket enables the screw 902 to rotate. The bracket may be any type of fastener and/or bracket that is operative to support the end 1102 of the screw 902 while allowing the screw 902 to rotate. Thus, the fastener does not impede the rotation of the screw 902. In some examples, the fastener may include a bearing or may be made of a low-friction material to reduce an amount of friction between the screw 902 and the fastener as the screw 902 rotates.

Figure 12:
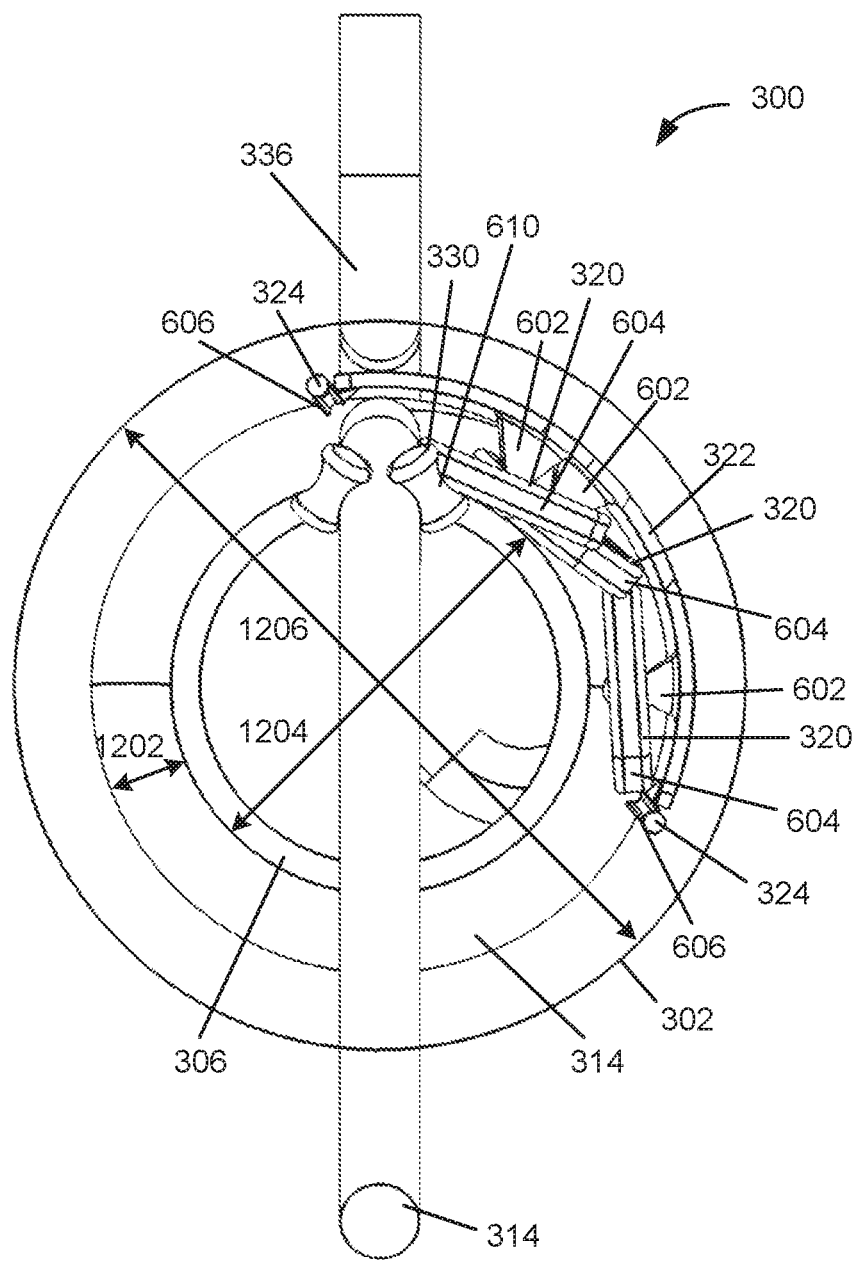
FIG. 12 is a rear view of the example refueling pod disclosed herein.

FIG. 12 is a rear view of the example refueling pod 300 disclosed herein. In the illustrated example, a diameter 1202 of the drogue hose 314 (e.g., the drogue hose diameter 1202) is approximately 2.7 inches. A diameter 1204 of the drum 306 (e.g., the drum diameter 1204), which is selected based on the ability of the drogue hose 314 to bend (e.g., the flexibility of the drogue hose 314), is approximately 15.4 inches. In other examples, the flexibility of the drogue hose 314 may be different and, thus, the drum diameter 1204 may be larger or smaller. Because the drogue hose 314 is coiled around the drum 306 in a single layer, the combined diameter of the drum 306 and the drogue hose 314 is approximately equivalent to the drum diameter (e.g., 15.4 inches) plus twice the diameter 1202 of the drogue hose (e.g., 2.7 inches), which is approximately 21 inches. In the illustrated example, a diameter 1206 of the housing 302 (e.g., the housing diameter 1206) is approximately 25 inches. Space between the drum 306 (with the drogue hose 314 coiled around the drum) and an outer diameter of the pod 302 is dedicated for the structure of the pod 302 (i.e., any structure to maintain the shape and strength of the pod 302, any structure to which the components described herein, including the drum 306, track 324, guides 320, etc., are attached).

Figure 13B:
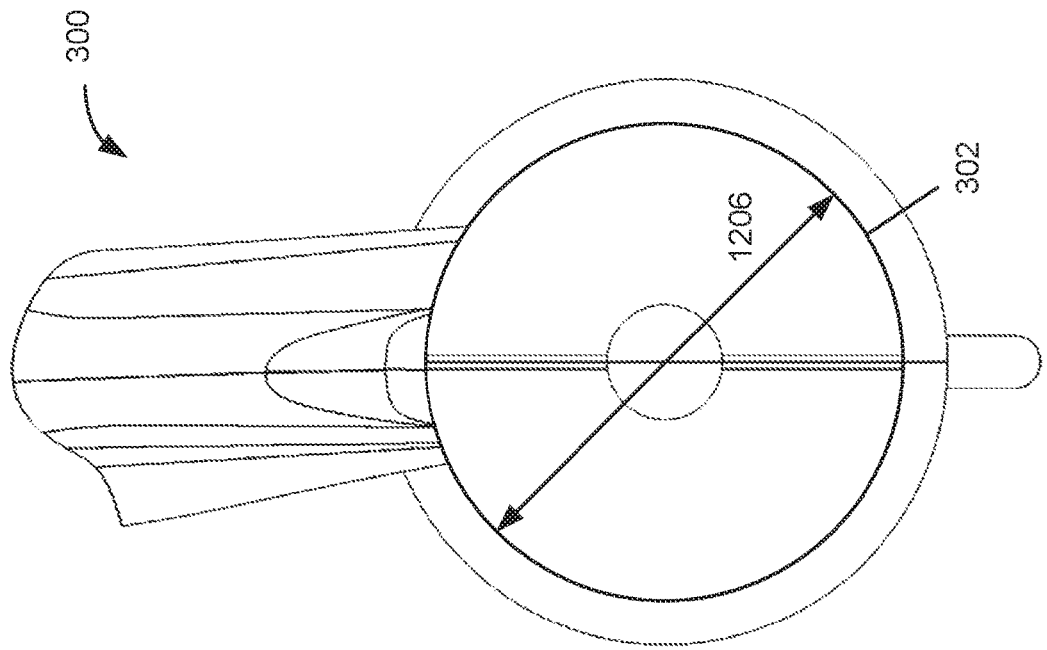
FIGS. 13A and 13B are a side-by-side comparison of front views of the known refueling pod of FIG. 2 and the example refueling pod of FIGS. 3-12 disclosed herein.
Figure 13A:
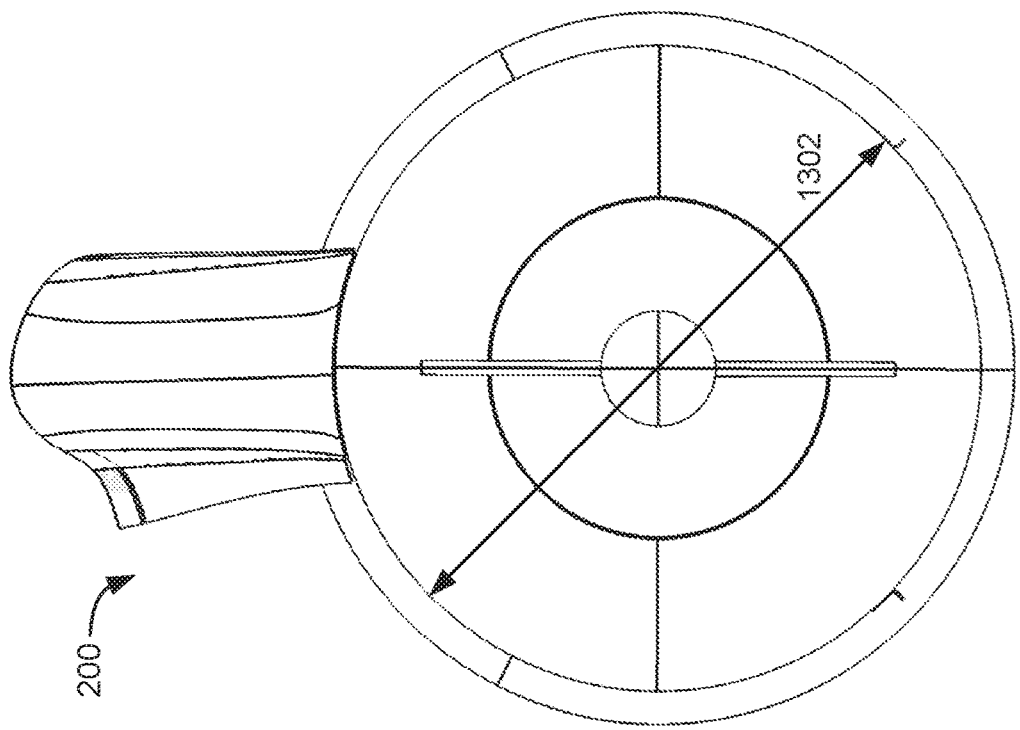
Figure 14A:
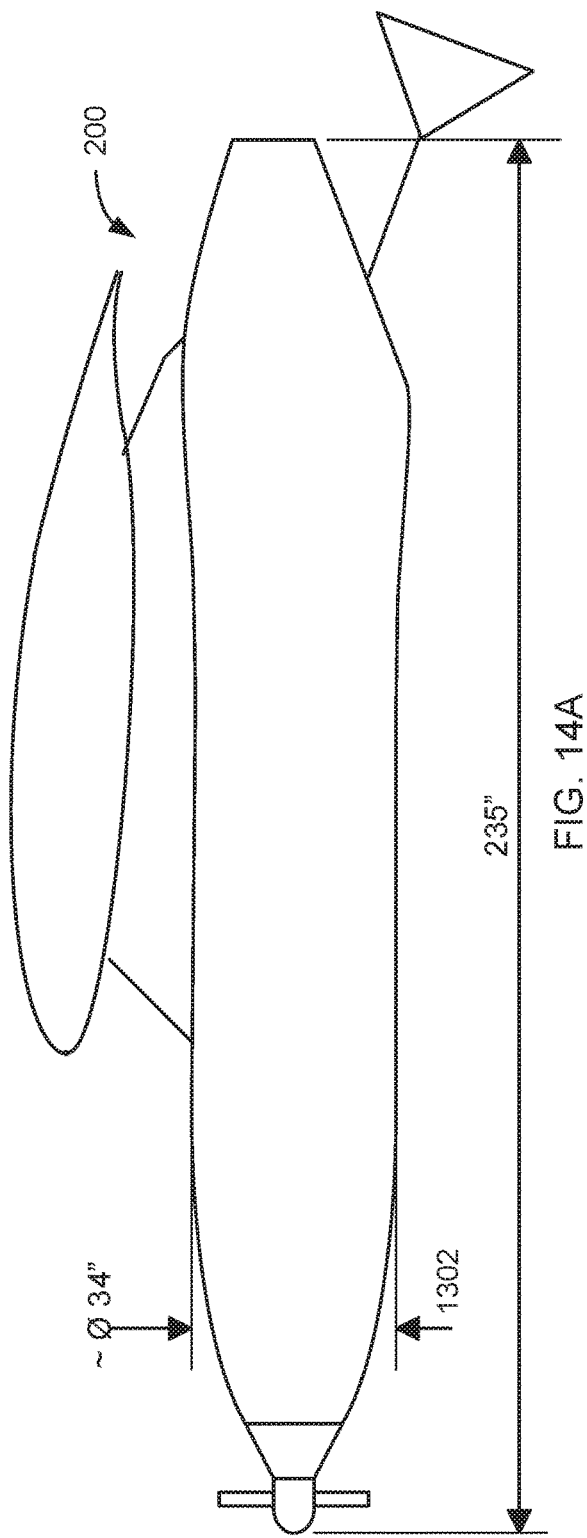
FIGS. 14A and 14B are a side-by-side comparison of side views of the known refueling pod of FIG. 2 and the example refueling pod of FIGS. 3-12 disclosed herein.
Figure 14B:
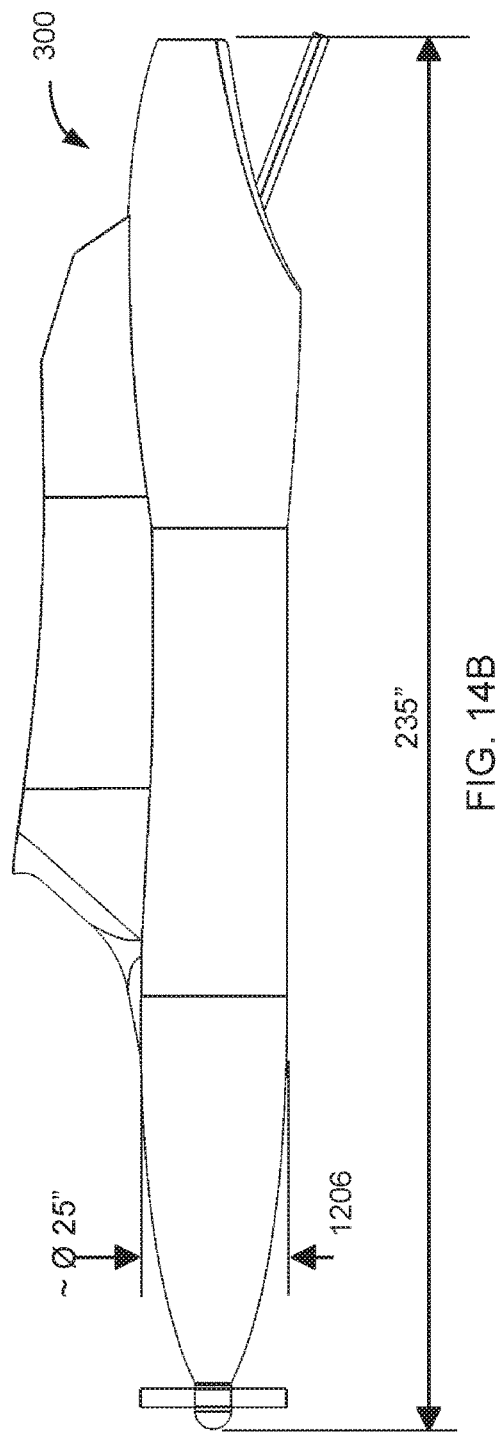

FIGS. 13A and 13B are a front view side-by-side comparison of the known refueling pod 200 of FIG. 2 and the example refueling pod 300 of FIGS. 3-12 disclosed herein and FIGS. 14A and 14B are a side view side-by-side comparison of the known refueling pod 200 and the example refueling pod 300 disclosed herein. FIGS. 13A and 14A depict the known refueling pod 200, which may have a diameter 1302 of approximately 34 inches. The example refueling pod 300, shown in FIGS. 13B and 14B, has a diameter 1206 of approximately 25 inches. The decreased diameter of the refueling pod 300 substantially reduces the effects the example refueling pod 300 has on the aerodynamic properties of the aircraft, such as the tanker aircraft 102. The decreased diameter also allows for the use of the example refueling pod 300 on smaller aircraft in a refueling operation called "buddy-buddy refueling" where, for example, one fighter jet (e.g., the fighter jet 104 acts as a tanker to supply fuel to another fighter jet (e.g., the fighter jet 106).

Figure 15B:
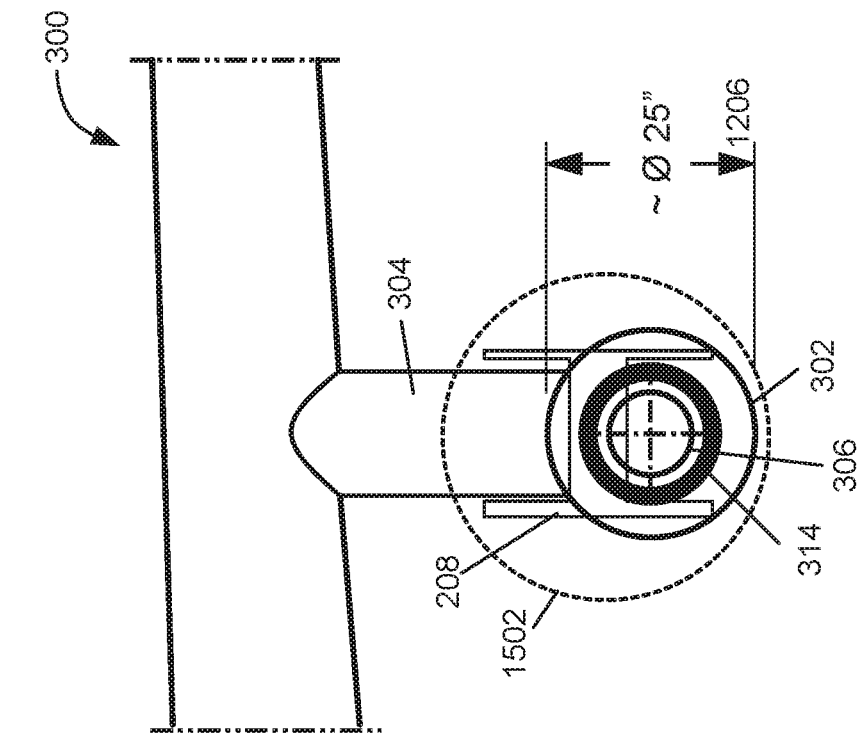
FIGS. 15A and 15B are a side-by-side comparison of front views of the spool of the known refueling pod of FIG. 2 and the drum of the example refueling pod of FIGS. 3-12 disclosed herein.
Figure 15A:
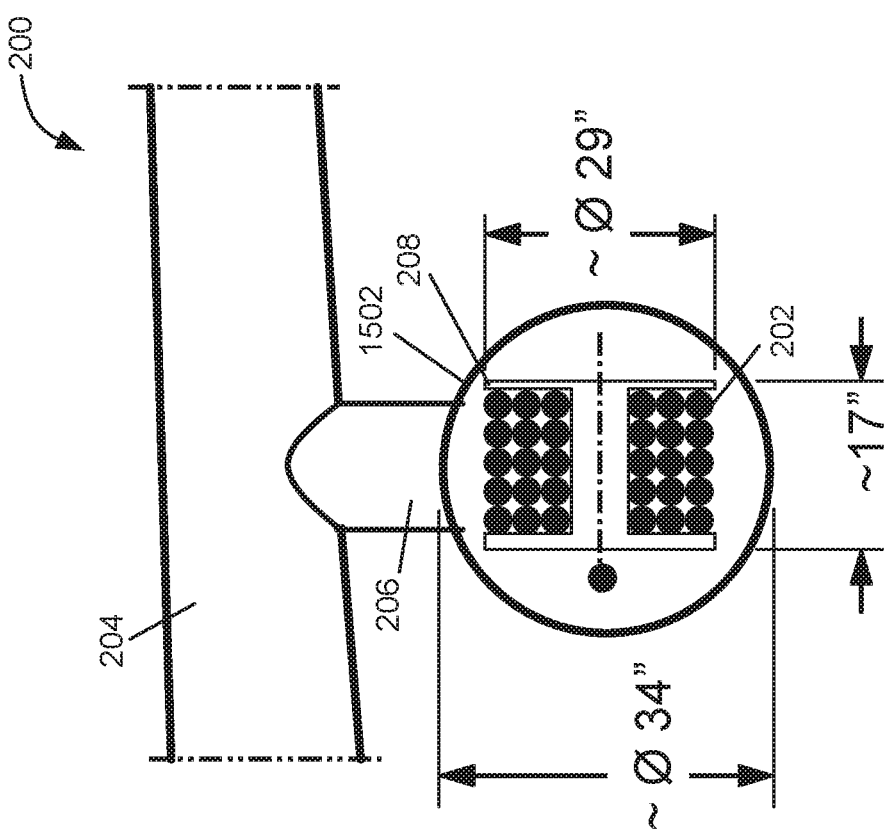

FIGS. 15A and 15B are a front view side-by-side comparison of the spool 208 of the known refueling pod of FIG. 2 and the drum 306 of the example refueling pod 300 of FIGS. 3-12 disclosed herein. As shown in FIG. 15A, an outline 1502 of the known refueling pod 200 having outer diameter of approximately 34 inches contains a spool 206 having dimensions including a diameter approximately 29 inches and a width of approximately 17 inches. The dimensions of the spool 206 are constrained by a necessity to wrap (coiled in three layers) the full length of the drogue hose around the spool 206 FIG. 15B shows the example refueling pod 300 disclosed herein. A dimension 1206 of an outer diameter of approximately 25 inches is smaller than the outer diameter of the known refueling pod 200, which is approximately 34 inches. The reduction in diameter is a result of the manner in which the drogue hose 314, which has the same or a similar length (e.g., at least 70 feet) of the drogue hose 202 of FIG. 2, is coiled on the drum 306 in only one layer and the orientation of the drum being parallel to the direction of flight.

From the foregoing, it will be appreciated that the above disclosed apparatus and articles of manufacture are operative to reduce the aerodynamic interference due to the refueling pods and, thus, lessens adverse effects of the refueling pods on the aircraft by decreasing the overall size of the refueling pods.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a pod structured to couple to an aircraft and to store a drogue hose;
   a drum disposed in the pod around which the drogue hose is coiled, wherein an axis of the drum is to be aligned with a direction of flight of the aircraft;
   a cart to support guides, the cart and the guides to move along a length of the drum to guide the drogue hose as the drogue hose is coiled around the drum, the guides including a first guide, a second guide, and a third guide, the first guide having a first axis of rotation in a first orientation relative to the drum, the second guide having a second axis of rotation in a second orientation relative to the drum, and a third guide having a third axis of rotation in a third orientation relative to the drum, the first orientation is different than the second orientation and the third orientation, and the second orientation is different than the third orientation; and
   exit rollers adjacent to a drogue chute cave of the pod, the exit rollers to guide the drogue hose as the drogue hose moves through the drogue chute cave.

2. The apparatus of claim 1, wherein the drum is to rotate about the axis in a first direction to coil the drogue hose and in a second direction to uncoil the drogue hose.

3. The apparatus of claim 1, further including a track, the track coupled to an interior structure of the pod parallel to the axis of the drum, and the cart slidably coupled to the track, wherein the cart is to move along the track to maintain contact between the guides and the drogue hose.

4. The apparatus of claim 3, wherein a movement of the cart along the track corresponds to a rotation of the drum, the cart to move a distance along the track to a diameter of the drogue hose for each complete rotation of the drum.

5. The apparatus of claim 4, further including a screw to coordinate the movement of the cart along the track with the rotation of the drum.

6. The apparatus of claim 5, wherein the screw is operatively coupled to a transmission to rotate the screw in a first direction or a second direction.

7. The apparatus of claim 3, wherein the cart is slidably coupled to the track via wheels.

8. The apparatus of claim 3, wherein the cart has a curvature to correspond to a curvature of the drum, wherein the cart and the guides attached to the cart are to at least partially surround a portion of a segment the drum.

9. The apparatus of claim 1, wherein the pod is coupled to a wing of a tanker aircraft to enable drogue-and-chute type refueling.

10. The apparatus of claim 1, wherein the pod is coupled to an aircraft to enable buddy-buddy type refueling.

11. The apparatus of claim 1, wherein the drogue hose is to coil around the drum in a single layer as the drum rotates, the guides to prevent slack in the drogue hose as the drogue hose is coiled around the drum.

12. An apparatus comprising:
    a rotatable drum;
    a first track positioned adjacent the rotatable drum;
    a cart to slide along the first track in a direction parallel to an axis of the drum; and
    a first pulley rotatably mounted to the cart, the first pulley having a first axis of rotation in a first orientation relative to the drum;
    a second pulley rotatably mounted to the cart, the second pulley having a second axis of rotation in a second orientation relative to the drum, the second orientation being different than the first orientation;
    a third pulley rotatably mounted to the cart, the third pulley having a third axis of rotation in a third orientation relative to the drum, the third orientation being different than the first orientation and the second orientation;
    the first, second and third pulleys are respectively configured to engage a fuel hose, the cart is configured to move the pulleys along a length of the drum as the drum rotates, the pulleys to guide the fuel hose as the fuel hose coils around the drum.

13. The apparatus of claim 12, wherein the first, second and third pulleys are mounted to the cart to enable the pulleys to rotate when the pulleys guide the fuel hose.

14. The apparatus of claim 12, further including a screw positioned adjacent the track, the screw operatively coupled to the cart to move the cart and pulleys along the length of the drum.

15. The apparatus of claim 14, wherein the screw is operatively coupled to a transmission to coordinate movement of the cart and pulleys with the rotation of the drum, the cart and pulleys to move a distance equal to a diameter of the fuel hose for each rotation of the drum.

16. The apparatus of claim 12, wherein the pulleys are configured to coil the hose around the drum in a single layer and prevent slack in the hose as the hose is coiled around the drum.

17. An apparatus comprising:
    a drum to rotate about a central axis;
    a hose coiled around the drum, wherein the hose is coiled in a single layer along a length of the central axis of the drum as the drum rotates;
    a cart having a curved body corresponding to a curved outer surface of the drum; and
    guides coupled to the cart to engage the hose, the guides positioned along the curved body of the of the cart such that the guides are oriented to correspond to the curved outer surface of the drum, the cart to move the guides along the length of the drum via the track to guide the hose as the hose is coiled around the drum, the guides to prevent slack in the hose.

18. The apparatus of claim 17, wherein the cart is to move along the track a distance equivalent to a diameter of the hose for each rotation of the drum.

19. The apparatus of claim 1, wherein an outer diameter of the pod is approximately 25 inches.

20. The apparatus of claim 12, wherein the cart has a uniform body having an arcuate profile complementary to an arcuate profile of the drum.

21. The apparatus of claim 1, wherein the cart is defined by a single plate having an arcuate shape to correspond to a curvature of the drum such that the single plate is to at least partially extend over the drum, the guides positioned between the single plate and the drum.

22. The apparatus of claim 20, further including a second track and guides supported by the cart, the cart defining a first leg, a second leg and a third leg, wherein the first leg is to engage the first track and the second and third legs are to engage the second track via the guides.

23. The apparatus of claim 17, wherein the curved body of the cart extends over at least a ninety-degree segment of the outer surface of the drum.

24. The apparatus of claim 17, further including a first track and a second track spaced from the first track, the first and second tracks oriented parallel to the drum, and wherein the cart slidably couples to the first track and the second track, the cart having a first roller at a first end of the curved body to engage the first track and a second roller at a second end of the curved body to engage the second track.

25. The apparatus of claim 12, wherein the pulleys are positioned between an outer surface of the drum and the cart.

* * * * *